Patented Mar. 3, 1925.

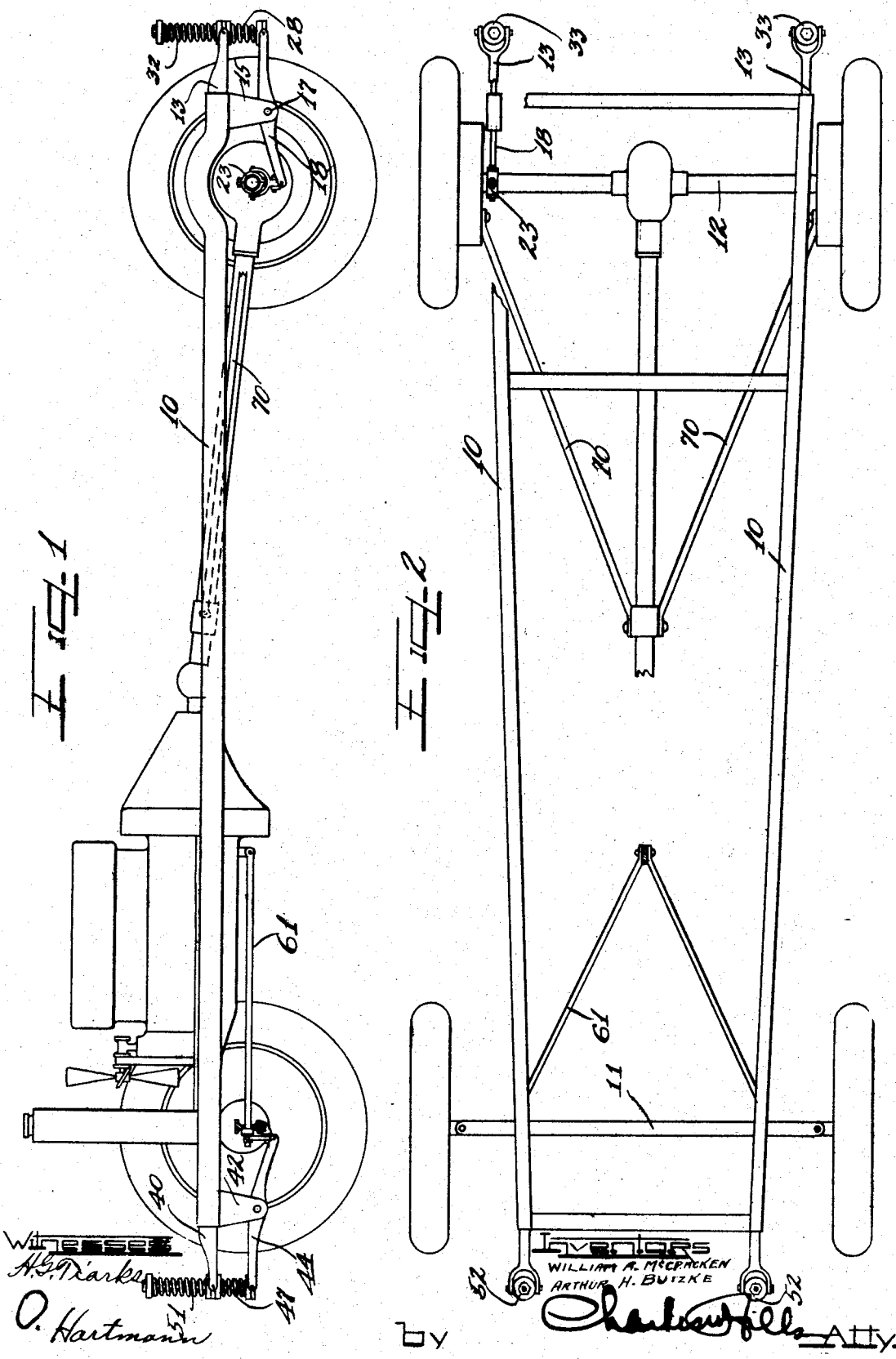

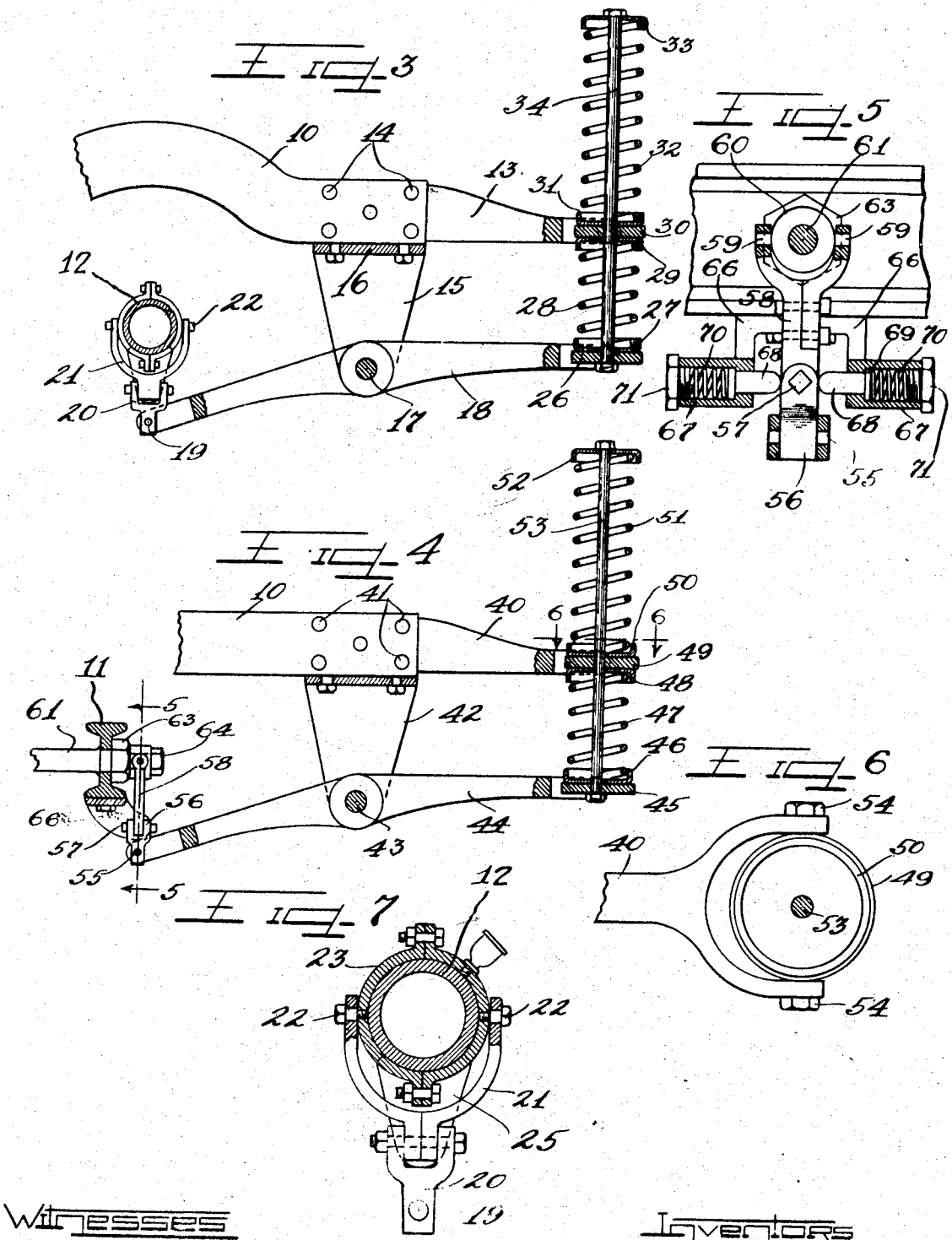

1,527,987

UNITED STATES PATENT OFFICE.

WILLIAM A. McCRACKEN AND ARTHUR H. BUTZKE, OF JOLIET, ILLINOIS.

VEHICLE SUPPORT.

Application filed October 28, 1922. Serial No. 597,469.

*To all whom it may concern:*

Be it known that we, WILLIAM A. MC-CRACKEN and ARTHUR H. BUTZKE, citizens of the United States, and residents of the city of Joliet, in the county of Will and State of Illinois, have invented certain new and useful Improvements in a Vehicle Support; and we do hereby declare that the following is a full, clear, and exact description of the same, reference being had to the accompanying drawings, and to the numerals of reference marked thereon, which form a part of this specification.

The present invention is a modification of the invention presented in the application of William A. McCracken and Arthur H. Butzke, filed August 7th, 1922, Serial No. 580,272. The invention presented in said application is intended to replace those springs which go at right angles to the length of the vehicle, while the invention presented in the present application is intended to replace those springs which go lengthwise of the vehicle.

The present invention has for its purpose the same general objects as those stated in said application, and in addition the following specific objects:

It is a particular object of the present invention to provide a means for supporting a vehicle upon its axle, in which all tendency to vertical motion shall be cared for by vertical helical springs which shall not be subjected to any sidewise stresses, and in addition provide for cushioning of all sidewise motions of the vehicle by additional helical springs which also shall be protected from all stresses at right angles to the length of the spring.

It is a further object of this invention to provide a set of springs, mounted upon the chassis connected only indirectly to the axle, for absorbing all vertical motions and an independent set of springs mounted upon the axle and unconnected with the chassis for absorbing the sidewise motion.

It is a further object of this invention to provide a support for vehicles of the type which heretofore has had leaf-springs parallel to the length of the chassis which shall avoid the inconvenience heretofore experienced from the twisting effect accompanying certain motions of the vehicle.

It is a further object of this invention to provide a device of the class described in which the main supporting spring and the spring for checking the recoil shall both be in the form of spiral springs in alignment with one another.

It is a further object of this invention to provide a universal joint connection between the levers abutting one of such springs and the axle whereby no twisting strain is put upon the levers or upon the pivots thereof.

Other and further important objects of this invention will be apparent from the disclosures in the specification and the accompanying drawings.

The invention (in a preferred form) is illustrated in the accompanying drawings and hereinafter more fully described.

On the drawings:

Figure 1 is a side view of the chassis of an automobile to which this invention has been applied.

Figure 2 is a top plan view of the chassis.

Figure 3 is a detail view, on an enlarged scale, of the connection of the rear spring support to the longitudinal member of the chassis.

Figure 4 is a similar view showing a connection between the front end of the chassis and the spring support supplied at that point.

Figure 5 is a section upon the line 5—5 of Figure 4.

Figure 6 is a section upon the line 6—6 of Figure 4.

Figure 7 is a detail showing, on an enlarged scale, of the parts shown in the lower left hand corner of Figure 3.

As shown on the drawings:

The chassis has the ordinary side members 10 and the usual front axle 11 and rear axle 12. As is shown in Figure 3, the rear end of the frame member 10 has bolted to it an extension 13, the forward end of which forms a filler block occupying the channel of the member 10 and affording abundant bearing for the bolts 14. The same portion of the member 13 serves as a bearing for the connecting part 16 of a U-shaped stirrup 15. The part 16 is bolted to the said filler block which is secured in place by the bolts 14.

The stirrup 15 supports a pin 17 which goes through the hub of a lever 18 which is bifurcated at each end. At the forward end the bifurcation carries a pin 19 through the bottom or spur of a yoke 20, best illustrated in Figure 7. The yoke 20 is pivoted to a larger yoke 21 which is in a plane approximately parallel to the plane of the yoke 20. The two limbs of the yoke 21 are connected by studs 22 to diametrically opposite sides of a ring 23 which surrounds the tubular rear axle 12.

A pair of brackets 25 are bolted to the under side of the rear axle, one on each side of the ring 23. These brackets support spring-pressed contact members similar to those illustrated in Figure 5, which will be described below in connection with the structure of the front axle. These contact members press against the spur of the yoke 21, and check the motion of the yoke 21 about the studs 22 as an axis.

The rear bifurcated end of the lever 18 pivotally supports a disk 26. Upon the upper side of this disk is placed a cup 27 which receives the end of a spring 28. The other end of this spring is received in a cup 29 which is against the lower face of a disk 30 pivotally mounted in the bifurcated rear end of the member 13. The upper face of the disk 30 has a cup 31 for receiving the lower end of a spring 32. The upper end of this spring is received in a cup 33. A bolt 34 passes from the upper side of the cup 33 to the lower side of the disk 26 and a nut on the bolt holds the several cups and springs together.

At each of the forward ends of the frame members 10, as illustrated in Figure 4, an extension member 40 is provided, which is secured to the frame member 10 by bolts 41 and acts as a filler block to which the U-shaped member 42 is bolted. The lower end of this U-shaped member supports a pin 43 which carries a lever 44 similar to the lever 18. The forward end of this lever is bifurcated and pivotally supports a disk 45 similar to the disk 26, and equipped with a cup 46 supporting a spring 47, the other end of which rests in a cup 48 bearing against a disk 49 which is pivotally mounted in the rear end of the member 40 and supports a cup 50 holding a spring 51 which bears against a cup 52. All of the several springs, cups and disks are threaded by a bolt 53 and all of them are similar to the corresponding parts described in connection with Figure 3. In Figure 6, the bifurcated end of the member 40 is shown having studs 54 which enter the disk 49 that supports the cup 50. The structure of the bifurcated ends of the levers 44 and 18, and of the member 13, is like the bifurcated end of the member 40 illustrated in Figure 6.

The rear end of the lever 44 is also bifurcated and supports a pin 55 which goes through the spur of a yoke 56 as may be seen from Figures 4 and 5. The yoke 56 has a pivot pin 57 going through the spur of a yoke 58. The yoke 58 has a longer spur than the yoke 56 in order that considerable sidewise motion may be provided. At the upper end the yoke 58 is provided with bearings for accommodating the studs 59 upon a collar 60 which is rotatably mounted upon the radius rod 61. Nuts 63 and 64 are provided on the radius rod in front of the axle 11. The larger nut 63 bears against the axle and serves, with a shoulder on the rod, the hold the rod in place. The other nut 64 is on the opposite side of the collar 60 and the two nuts thus hold the collar rotatably on the rod.

It will be observed that levers 18 and 44, and the extension members 13 and 40, are parallel to the length of the automobile but not parallel to the lengthwise members 10, which converge toward the front of the automobile. Upon the under side of the front axle 11, as illustrated in Figure 5, are secured two brackets 66, each of which supports a cylinder 67 carrying a plunger 68. The plungers protrude through the ends of the cylinders toward the lower end of the spur of the yoke 58. At the interior of the cylinder, each plunger has an enlarged head 69 which affords a stop to the motion of the plunger toward the spur. The head 69 preferably does not fit the cylinder tightly but leakage around the head is possible so that motion of the head of the plunger along the cylinder affords a dash-pot action. The plungers are returned to the position illustrated in Figure 5 by springs 70, and the outer ends of the cylinders are closed by cap nuts 71 so that the springs bear between the heads 69 and the nuts 71. The pressure devices at the lower ends of the brackets 25 illustrated in Figures 3 and 7, which press against the lower end of the spur 26 on the yoke 21, are similar in construction to the cylinders and plungers just described.

In the operation of the device, when a load is placed upon the vehicle, the increased weight causes the members 10 to descend. This results in the pivot pins 17 descending, but the pivot pins 19 being secured to the axle 12 do not descend. The lever 18 therefore moves about the point 19 as a fulcrum with the result that the rear end of the lever is drawn downward relative to the member 13. The spring 32 is therefore compressed and the spring 28 is somewhat expanded. In the same way, when the vehicle is loaded, the downward motion of the forward part of the members 10 will result in a lowering of the pivot pin 43 relative to the pin 55 so that the lever 44 moves about the pin 55 as a fulcrum and the spring 51 is compressed while the spring 47 is somewhat expanded. Thus the load is normally carried by the springs 32 and 51. The nuts upon the bolts 34 and 53 are preferably tightened enough so that except under the most extreme loads, springs 28 and 47 are in a condition of slight compression.

When the vehicle passes over a rough place in the road and a sudden upward movement of the forward axle 11 results, the spring 51 is still further compressed and the spring 47 expands slightly. In the same way an upward movement of the rear axle 12 results in an additional compression of the spring 32 and a slight expansion of the spring 28. When upward motion of the forward axle 11 ceases, as it would after the vehicle has passed the bump in the road, the spring 51 lifts the rear end of the lever 44 and so lifts the pin 43, and thus lifts the member 10. But when the position of equilibrium is reached, the member 10 does not stop but continues to move upward under its momentum. This motion causes the lever to compress the spring 47. Thus the spring 47 acts to check the rebound of the vehicle. Because this spring acts with gravity it does not need to be as strong as the spring 51 which acts against gravity. In the same way, when the upward motion of the rear axle 12 ceases, the spring 32 will expand and bring the parts back toward the illustrated position, lifting the rear end of the lever 18 and so lifting the pivot pin 17 and thus lifting the member 10. When the illustrated position is reached, the momentum of the vehicle and of the member 10 causes the upward motion to continue a small distance, causing the compression of the spring 28 and the action of this spring soon checks the upward motion. For the same reason that the spring 47 does not need to be as strong as the spring 51, the spring 28 is made lighter than the spring 32.

When the motion occurs at one end of the vehicle, for example when the forward end moves down relative to the rear end, the action of the radius rods 70 makes the motion at the rear end of the vehicle approximately a rotation about the center of the axle 12 as an axis. This is accompanied by a sliding of the rings 23 about the axle 12, so that there does not result any strain upon the pivot pins 19 and 17. In the same way, when the rear end of the axle moves downward relative to the forward end, the motion at the forward end is substantially a rotation about the center of the axle 11 as an axis because of the effect of the radius rods 61. This is accompanied however by a rotation of the collars 60 about the rods 61 and a swinging of the links 58 and 56 about their several pivots, so that no sidewise thrust is given to the rear end of the lever 44 and thus no twisting strain is given to the pin 43.

If there is a sideways motion of the forward end of the vehicle relative to the forward axle there results a rotation of the collars 60 about the rods 61. By means of the double joint between the collars and the rear ends of the levers 44 this is translated into a simple, direct, upward pull upon the levers without any sidewise motion to twist the levers and introduce a twisting of the pivot pins 43. In the same way, when there is a sidewise motion of the rear end of the vehicle relative to the axle 12, there results a motion of the stirrup 21 about the pivots 22 which is translated into a direct upward pull upon the forward ends of the lever 18 without introducing any sidewise stress upon the pivot pin 17.

Thus, for any motion of the vehicle in any direction relative to its axle, the motion is translated into a direct up and down movement of the rods 34 and 53 with a correspondingly direct compression or expansion of the helical spring. The sidewise motion of the vehicle is checked by the springs 70 in the case of the forward axle and by similar springs supported from the brackets 25 in the case of the rear axle, so that in all cases such sidewise motion is effectually checked.

We are aware that numerous details of construction may be varied through a wide range without departing from the spirit of this invention, and we therefore do not purpose limiting the patent granted otherwise than is necessitated by the prior art.

We claim as our invention:

1. A means for supporting a vehicle from its axles including four levers each pivoted to the chassis respectively near the corners thereof, each of said levers being mounted to swing in a vertical plane parallel to the length of the chassis, resilient means for supporting said vehicle, said means including spiral springs for holding said levers in definite position relative to the chassis, universal joint connections between said levers and the axles, and means for cushioning said universal joint connections against lateral movement.

2. In a vehicle, a forward axle, radius rods traversing said axle, collars rotatably mounted upon said radius rods, levers pivoted in front of said axle, universal joint connections between said collars and the rear ends of said levers, resilient connections between the forward ends of said levers and the chassis member, and means for cushioning said universal joint connections against lateral movement.

3. In a vehicle, a rear axle, rings surrounding said rear axle, levers pivoted to the rear of said rear axle for motion in a vertical plane parallel to the length of the vehicle, universal joint connections between the forward ends of said levers and said rings, resilient connections between the rear ends of said levers and said chassis frame, a forward axle, rods traversing said axle, collars rotatably mounted upon said rods, levers pivoted in front of the forward axle, universal joint connections between said collars and the rear ends of said levers, resilient connections between the forward ends of said levers and the chassis member, and means for cushioning said universal joint connections against lateral movement.

In testimony whereof, we have hereunto subscribed our names in the presence of two subscribing witnesses.

WILLIAM A. McCRACKEN.
ARTHUR H. BUTZKE.

Witnesses:
   OSCAR F. SUMBAUM,
   HAROLD LARSEN.